United States Patent [19]

Gondouin

[11] 4,194,280
[45] Mar. 25, 1980

[54] PROCESS FOR THE MANUFACTURE OF RIGID AND IMPERVIOUS INSULATING PANELS

[76] Inventor: Michel Gondouin, 32 San Marino Dr., San Rafael, Calif. 94901

[21] Appl. No.: 713,231

[22] Filed: Aug. 10, 1976

[51] Int. Cl.$^2$ .................. B23P 17/00; B29C 17/4; B29D 27/04
[52] U.S. Cl. .................. 29/417; 29/412; 29/432.1; 29/458; 29/509; 156/79; 156/148; 264/45.9; 264/46.3; 264/46.5; 264/46.6; 264/46.7; 264/103; 264/165; 264/257; 264/267
[58] Field of Search .......... 264/46.4, 46.2, 46.5, 264/46.1, 46.6, 46.7, 257, 103, 267, 231, 46.3; 156/148, 78, 92, 79; 29/433, 453, 412, 417, 432.1, 458, 509, 165

[56] References Cited

U.S. PATENT DOCUMENTS

| | | | |
|---|---|---|---|
| 3,374,132 | 3/1968 | Boggs | 264/103 |
| 3,537,929 | 11/1970 | Keith et al. | 264/46.3 |
| 3,592,884 | 7/1971 | Williams | 264/46.7 |
| 3,986,918 | 10/1976 | Berner | 264/46.6 |

Primary Examiner—W. E. Hoag

[57] ABSTRACT

Machines and process for making in a continuous operation a prestressed glass reinforced, thermally insulating panel, structurally stiff, and totally impervious, of indefinite length and with a cross-section shaped as an elongated parallelogram.

Steps for manufacture include making the surface of the panel out of a tubular envelope of knitted or woven glass fabric, stretched over a special holding frame, to give it the desired parallelogram shape. Fastened by a continuous knitting process to the opposite faces of the glass fabric envelope, other glass fibers are stretched inside the envelope and arranged according to three principal directions, all of them oblique with respect to the panel faces. The glass fabric envelope is then coated with a plastic resin to make it impervious to gas and covered on one face at least with a metal liner. This liner, made of cryogenic alloy, has its edges upturned and folded, so as to be fastened to the glass reinforced plastic envelope. Finally, the envelope is filled with a foamed-in-place thermal insulation, which, in expanding, surrounds each of the reinforcing glass fibers locked and held in a stretched position. Consequently, when released from the holding frame, after the foam has hardened, the relaxed tension of glass reinforcing fibers applies a compressive stress to the foam, directed normally to the panel faces. The oblique disposition of the reinforcing fibers is achieved by 4 knitting machines located in 4 non parallel spatial planes. The finished panels are used for constructing cryogenic tanks in LNG ships.

16 Claims, 8 Drawing Figures

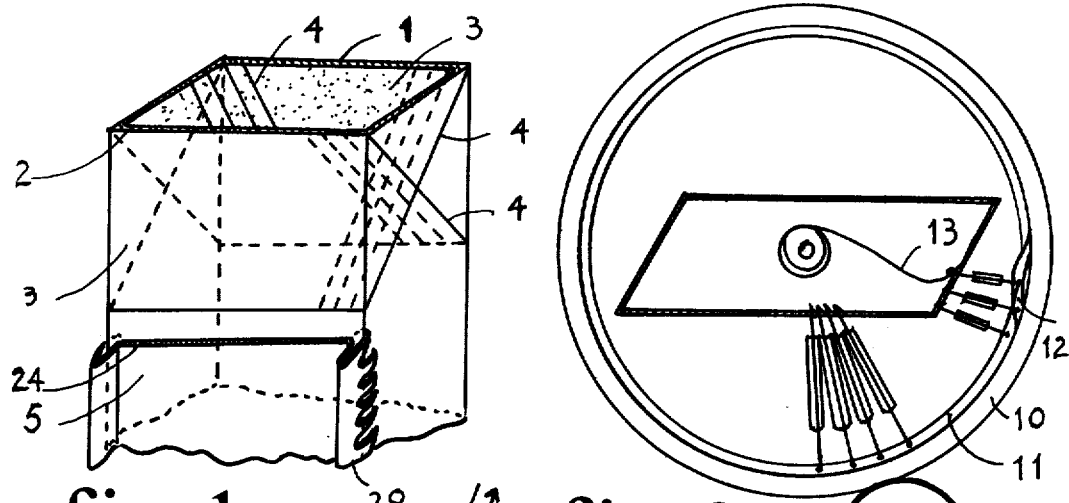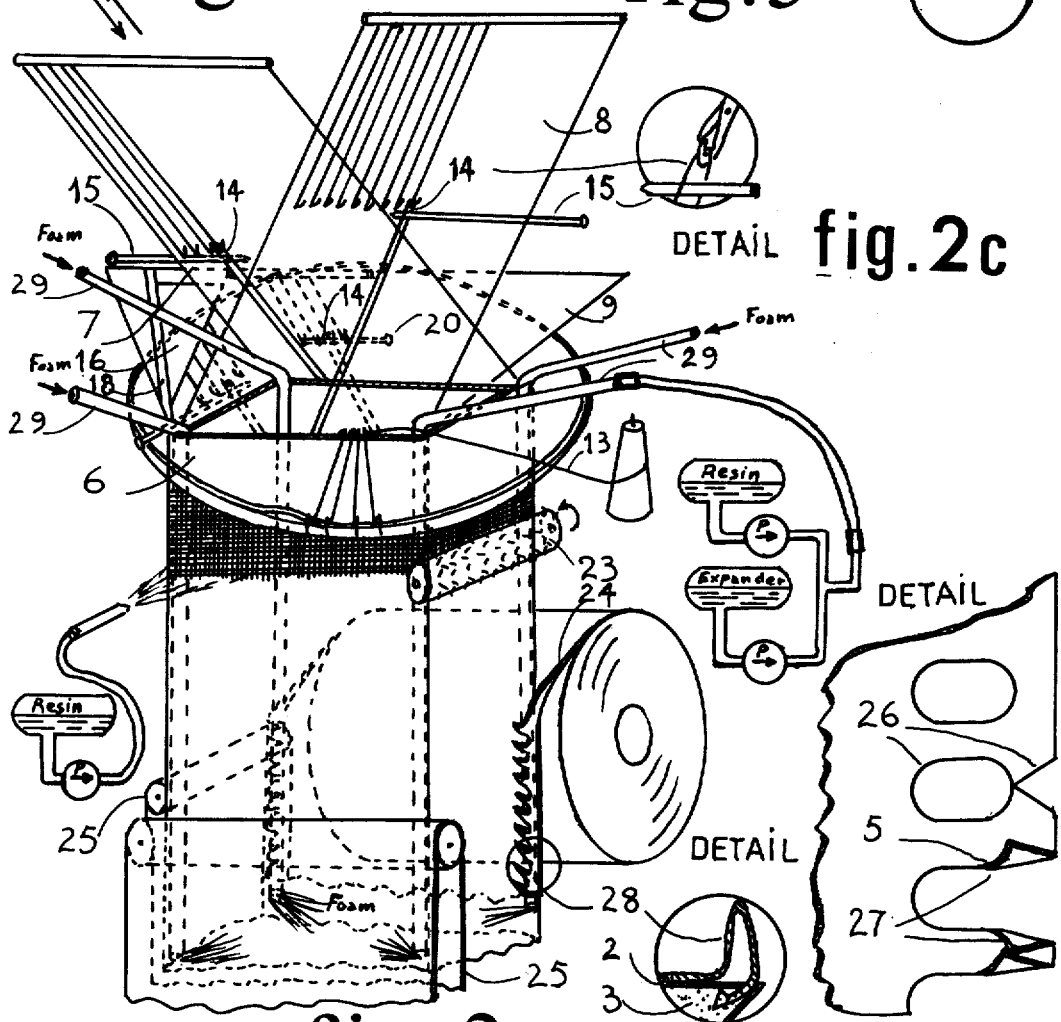

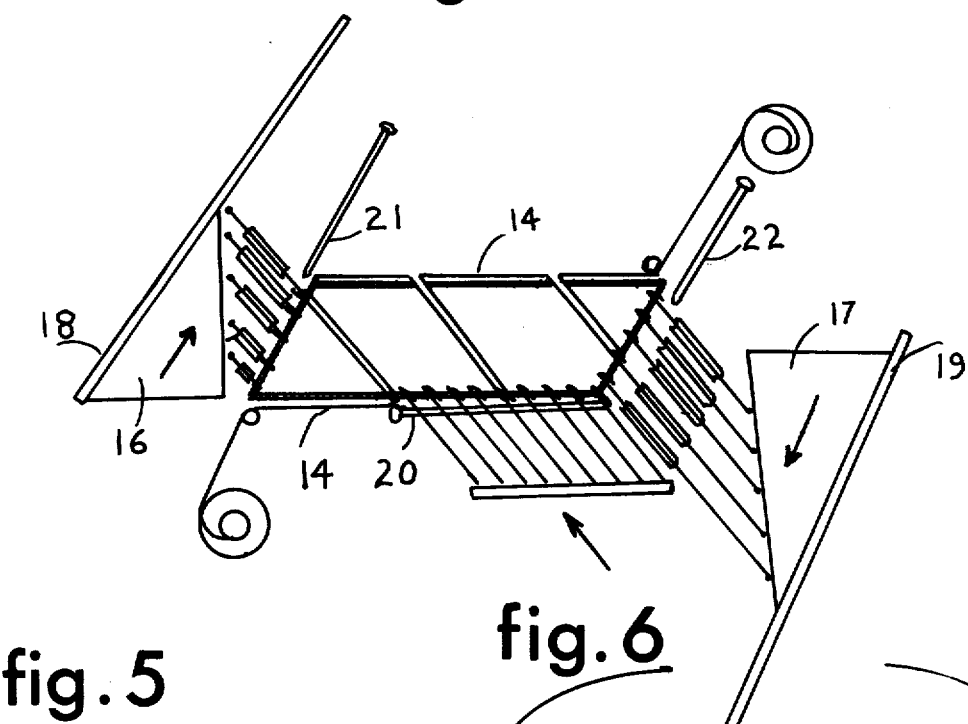
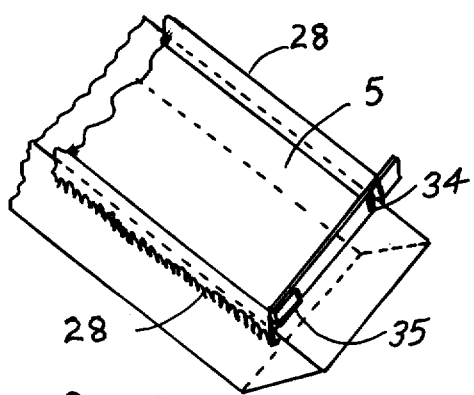
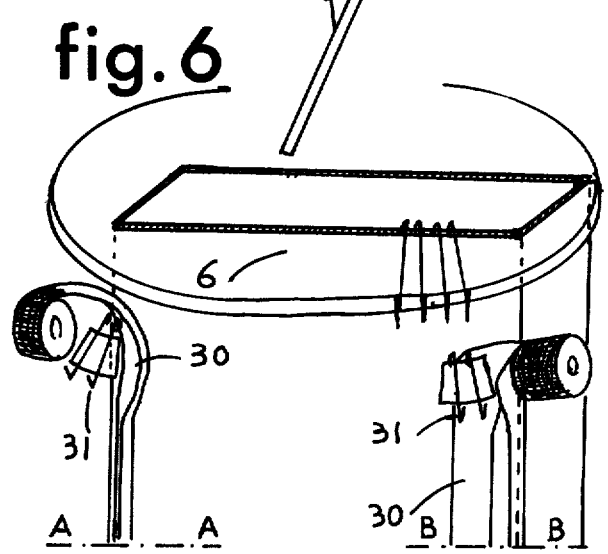
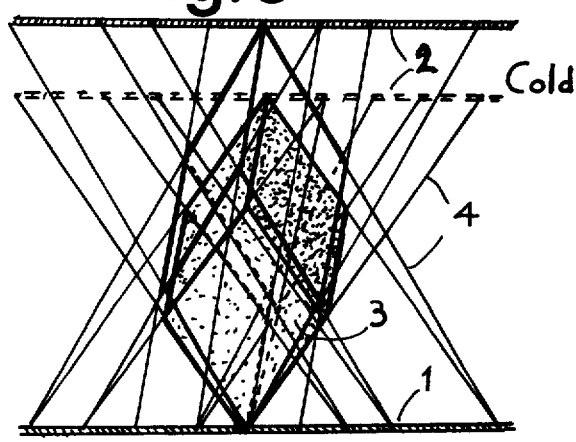
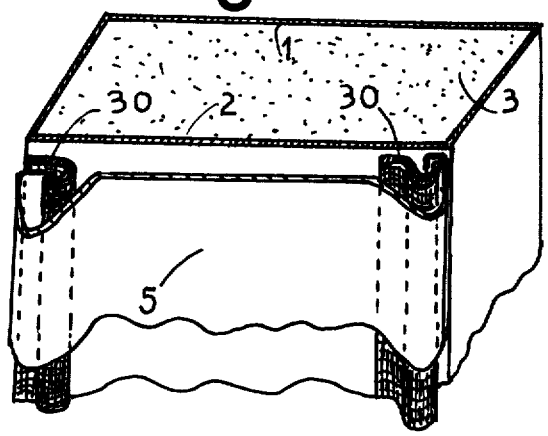

PROCESS FOR THE MANUFACTURE OF RIGID AND IMPERVIOUS INSULATING PANELS

REFERENCES CITED

U.S. Pat. No. 3,942,331 3/9/1976 R. O. Newman et al.; No. 3,757,982 9/11/1973 Isenberg et al.; No. 3,322,868 4/30/1967 W. E. Kruse et al.; No. 3,299,598 6/10/1964 J. Alleaume.

Foreign French Patents No. 2,129,931 3/22/1971 P. B. Vidal; No. 1,593,740 7/10/1970 Bridgestone Liquefied Petroleum Gas Co., No. 1,335,793 Conch International Methane Ltd.

BACKGROUND OF THE INVENTION

1. Field of the Invention

The present invention relates to the prefabrication of insulating panels used as the structurally stiff and gas impervious insulating wall of cryogenic tanks of the membrane type, in which the cryogenic liquid (LNG, liquid ethylene, nitrogen, oxygen, etc.) is contained by a thin metal liner (membrane) supported by a rigid insulating layer which transmits the hydrostatic and thermal stresses due to the cold liquid to an outer load-bearing vessel structure (inner hull of a ship, concrete or steel tank, etc.) which remains at a temperature close to ambient.

2. Description of Prior Art

The insulating panels used in the past for such applications were made of plywood, or of plywood and of balsa wood, or of plywood boxes filled with perlite, or of plastic foam reinforced with plywood or other materials. The metal liner was then fastened to the finished wall. A common feature of all these systems is the small size of the individual elements entering in the construction of large cryogenic tank walls by these known processes.

The present invention eliminates this major drawback by providing all three required elements of a cryogenic membrane tank:

cryogenic membrane liner
impervious secondary cryogenic barrier
rigid insulation in prefabricated panels of large dimensions, so that construction of the tank requires considerably less on-site work.

SUMMARY OF THE INVENTION

The main object of the present invention is the manufacture by a continuous process, of rigid panels of indefinite length, which are structurally strong enough to be handled in lengths exceeding 60'. Such a panel, of typical dimensions 60'×2'×1' is designed as a structural beam, the cross section of which is an elongated parallelogram. The panel is shown on FIG. 1: it is analogous to a box girder made of a glass fabric reinforced plastic envelope (1) and (2), filled with plastic foam (3) and strengthened by an internal web of glass fibers (4) arranged in a three dimensional network, according to three directions oblique with respect to the panel faces. The cryogenic metal membrane (5) is made of a thin gauge sheet of Invar, stainless steel, or titanium Alpha alloy. Its edges are upturned and folded back so as to increase its stiffness. The folded part is either hooked into the mesh of the glass fabric envelope, as shown in FIG. 2, or inserted in a glass reinforced plastic channel 30 or 31, structurally integrated by knitting into the glass fabric envelope, as shown on FIG. 7. The edge surfaces of the panel are parallel to the principal direction of one of the reinforcing glass fibers 4. The beveled edge surface of the panel, resulting from the parallelogram shaped cross-section, facilitates the assembly of adjacent panels and provides a larger glued area at the joint between panels. The insulating foam, at ambient temperature, is subjected to a compressive stress perpendicular to the panel face, as a result of the built-in tension of the reinforcing glass fibers. This compressive stress prevents cracking of the foam when the panel is subjected to flexion during handling and to a temperature gradient when in service.

Because the thermal expansion coefficient of the plastic foam is greater than that of the reinforcing glass fibers, the effect of cooling the inner face of the panel is to contract the foam and to relax the tension of the glass fibers as shown on FIG. 8. The net effect is a slight reduction in thickness of the panel, without any appreciable reduction in its lateral dimensions.

BRIEF DESCRIPTION OF THE DRAWINGS

FIG. 1 is a perspective view, partially broken away, of the panel showing the disposition of the glass fibers along three direction oblique with respect to the membrane covered panel face.

FIG. 2 is a perspective view of the machine used to fabricate said panels, including detailed views showing how the metal membrane is cut and folded, (FIGS. 2a, 2b) and how the glass fibers are held in the knitting machines. (FIG. 2C).

FIG. 3 is a plane view of the knitting machine located in plane 6 of FIG. 1.

FIG. 4 is a plane view of the knitting machines located in plane 9 of FIG. 1.

FIG. 5 is a perspective view, partially broken away, of the end of a panel, showing how the membrane in one embodiment is held by its hooked edges and stiffened by folding its end.

FIG. 6 is a perspective view, partially broken away, of the knitting machines making the glass reinforcing fabric of the plastic channels which, in another embodiment, are used to hold the membrane.

FIG. 7 is a perspective sectional view of a panel showing how the folded membrane is held, in the embodiment corresponding to FIG. 6.

FIG. 8 is a perspective view of an elemental volume of foam constrained by its surroundings glass fibers, and its schematic deformation when one face of the panel is subjected to a low temperature.

DETAILED DESCRIPTION

The following description and drawings show how such panels are manufactured:

The outer glass fabric envelope and the network of reinforcing glass fibers are obtained preferably by knitting processes, but they can also be achieved by special weaving on appropriate looms. Only the knitting process is described here, but the various knitting operations can also be done by weaving, in particular by using the "double plush" weaving technique used for making velours cloth, and by omitting the splitting operation which is part of this technique.

The knitting process is shown schematically on FIG. 2. It includes at least 4 sets of knitting hooks of a known type, located spatially in at least 4 different planes 6,7,8,9, non parallel to each other. In plane 6, transverse to the axis of the tubular envelope, the hooks are placed in guides as shown on FIG. 3. Motion of the hooks is determined by the rotation of the outer ring 10. On this ring a groove 11 receives the bent tail end of the hooks. A deviation of the groove from the circular shape in 12 causes each hook successively to slide back and forth in its guide. These sliding motions of limited amplitude, enable the hook to catch the inside thread 13 in order to make a mesh. Each turn of the ring 10 thus makes a new row of meshes of the knitted tubular envelope.

The hooks located in planes 7 and 8 are arranged in two combs, which move respectively downward in each plane thru the knitted tube to catch the outer thread 14 over the entire width of the panel on each face. When pulled upward, the hooks carry the thread thru the knitted envelope, forming elongated meshes which are caught by a transverse needle 15 and stored in position. The machine thus makes two oblique networks of parallel elongated meshes, of which each layer is stored on a transverse needle 15. The 3rd network of elongated meshes is made in plane 9 as shown on FIG. 4. It is made by a comb-type set of hooks for the central part of each layer, in which all elongated meshes have the same length. For the triangular parts of the section, two sets of guided hooks of variable length are used. Their reciprocal motion is caused by a triangular pusher cam, 16 or 17, moving along a guide, 18 or 19, as shown in FIG. 4. The needles 20, 21, 22, on which are stored these elongated meshes are respectively along one of the faces of the panel, and along each of the beveled edges. The hooks in planes 7, 8, and 9 are separated by an interval equal to that of 3 meshes in plane 6. Those of plane 7 are shifted by one mesh interval, with respect to those of plane 8, and by 2 mesh invervals with respect to those of plane 9, so that hooks can move without any interference. When the outer hooks in plane 6 have reached a storage needle, they pick up the stored elongated mesh and knit it together with the mesh of the tubular envelope. When all meshes stored on any needle have thus been knitted, the needle 20 is withdrawn and recycled to an upper position 15. The interchange of the needle position is caused by a mechanical system not shown on FIG. 2.

Instead of storing the elongated meshes on the storage needles 15, 20, in another embodiment of the invention, the elongated meshes in planes 7 and 8 are knitted into the envelope immediately after they have been pulled. This is accomplished by another knitting machine identical to that of FIG. 3, located above plane 6, and parallel to it. The inner thread of this knitting machine, in securing the elongated meshes, also makes the tubular envelope into a double-knit fabric, stronger than the simple knit manufacturing process achieved with a single knitting machine of the type shown on FIG. 3. In still another embodiment of the invention the elongated meshes on plane 9 are also immediately knitted after they have been pulled, thereby eliminating the need for storage needles 20. This knitting is done by a third machine of the type shown on FIG. 3, located in a plane parallel to 6. The envelope then becomes a triple knit fabric of great strength.

The tubular hose thus knitted, together with its three-dimensional network of reinforcing glass fibers, is held stretched on a holding frame made of 4 guide tubes 29, which materialize the edges of the panel. The interval between guide tubes increases progressively downwards, so as to place the envelope and its reinforcing glass fiber network under increasing transversal tension while the envelope is pulled axially downward by the rollers 23. The outer faces of the envelope are sprayed with plastic resin so as to make them totally impervious to gas, and to permanently anchor the reinforcing glass fibers.

A metallic membrane 24, made of a thin gauge Invar, Titanium alloy, or stainless steel sheet, is then folded and/or punched and fastened to the envelope as shown in 28 on FIG. 2.

The assembly then proceeds into a pressure resistant mold made of metal conveyor belts 25, on 3 faces, and of the metallic membrane on the 4th face. All metal surfaces in contact with the plastic coated envelope are treated with silicone or any other suitable mold release agent. They are backed by fixed steel plates acting as the load-bearing structure of the pressure resistant mold. The insulation material is then foamed in place inside the impervious envelope and fills the entire space, between the taut reinforcing glass fibers. The liquid resin, mixed with an expanding agent such as Freon is introduced into the pressure resistant mold by means of the guide tubes 29. The resin is preferably a polyurethane, polyester epoxy or PVC, or any other material which does not become too brittle at low temperature. For this reason, polystyrene and phenolic resins are excluded. Upon hardening, the foam is locked in place between the fibers and the stretched envelope.

After emerging from the mold, the finished panel, covered with the metallic membrane liner 5 on one face is released from the tension of the guide tubes 29. Consequently, the stretched envelope and reinforcing fibers tend to relax, thereby applying a compressive stress on the foam. Because of the oblique orientation of the three directions of the reinforcing fiber network, the compressive stress on the foam is applied primarily along the resultant of the corresponding 3 tensile forces. This resultant is oriented in the direction perpendicular to the face of the panel. Prior to its incorporation into the panel, the metal liner is straightened, perforated, folded and shaped as shown on 26, 27, and 28. The continuously produced panel is cut to the required length for each application and the edges of the metal liner 5 are upturned, folded and welded as shown on FIGS. 5, 34 and 35, so as to make with the membrane folded edges 28 a stiff frame.

The manufacture of such panels, and the machines described herein can be applied to the fabrication of composite structural insulating panels of indefinite length, which are doubly impervious thru the presence of a leak-proof metal liner over a gas-tight plastic impregnated glass fabric envelope.

Such panels are used for the construction of cryogenic tanks in LNG ships and in shore terminals. They can also enter into the construction of refrigerated trucks, tank cars, ship containers, etc., and of insulated buildings. Their use is not limited to these applications, which are only given as examples.

We claim:

1. A process for making in a continuous operation an insulating fiberglass reinforced rigid foam panel of indefinite length and of parallelogram-shaped cross section, characterized by the following steps: 1/ fabricating a tubular glass fabric envelope to which are attached glass reinforcing fibers oriented along three principal directions oblique with respect to the panel face, so that the resultant tension of said fibers is directed perpendicularly to the panel face, 2/ stretching said envelope and glass fiber over a holding frame, 3/ impregnating said glass fabric envelope with a thermosetting resin so as to make said envelope impervious to gas, 4/ folding of a metallic membrane so as to fasten its edges along the edges of said impervious envelope, 5/ filling said impervious envelope with a foaming gas saturated liquid resin so as to occupy the entire space separating said glass fibers, 6/ heat curing said expanded resin into a rigid foam, 7/ releasing said foam filled impervious envelope from the stretching forces applied by said holding frame so as to subject said rigid foam to compressive stresses applied primarily along the direction perpendicular to said panel face.

2. A process for making insulating and impervious panels as described in claim 1, characterized by (1) covering on one of its faces the resin-impregnated fabric envelope of the panel with a leak-proof weldable metal liner; (2) fastening lengthwise said membrane to the sides of the said envelope by means of the upturned and folded edges of said membrane.

3. A process for making impervious panels of prestressed rigid insulating foam as described in claim 1, characterized by the disposition of the taut reinforcing glass fibers, along three principal directions which are oblique with respect to the membrane covered face of the panel, so as to prestress the foam primarily in the direction perpendicular to that face.

4. A process as described in claim 1, characterized by the use of a holding frame including four nearly parallel springy guide tubes over which is stretched the tubular glass fabric envelope into which are knitted and resin-anchored some glass fibers making a three dimensional reinforcing web.

5. A process as described in claim 1, including anchoring said reinforcing fibers and impregnating said glass fabric envelope with a plastic resin making the envelope impervious prior to covering it on one face with a leak-proof metallic membrane, and prior to filling it with plastic foam injected into a pressure resistant mold.

6. A process as described in claim 1, characterized by the injection under pressure of a liquid resin and expander mixture by means of four guide tubes into the envelope so as to encase the reinforcing web with a foam which sets into a rigid insulating filler.

7. A process as described in claim 6, in which the injection of the liquid resin is made by means of injector tubes supported by guide tubes.

8. A process as described in claim 1, to anchor the reinforcing fibers and to impregnate the glass fiber envelope with a plastic resin making the envelope impervious prior to covering it on one face with a leak-proof metallic membrane, and prior to filling it with plastic foam injected into a pressure resistant mold.

9. A process as described in claim 8, to fasten a metallic membrane to the edges of the panel face by means of folded hooks imbedded in the fabric of the envelope.

10. A process as described in claim 8, including fastening said metallic membrane to the edges of said panel face, by means of glass fabric reinforced plastic channels in which the folded edges of the membrane are inserted, and held in place by welding the upturned transverse edges of the membrane so as to form a stiff frame.

11. A process according to claim 8, to cut the finished panel to the desired length and to weld the upturned transverse edges of said membrane to the folded lengthwise edges of said membrane so as to form a stiff frame.

12. A process for making rigid, thermally insulating and impervious panels as described in claim 1, characterized by:
fabrication in a continuous knitting operation of said tubular glass fabric envelope, and of its internal reinforcing fiber glass web, over said holding frame of variable cross section.

13. A process as described in claim 12, to make in a continuous process a glass fiber structure including said tubular fabric envelope and said reinforcing web by means of four knitting machines of known design, the hooks and storage needles of which, also of known design, move in four non parallel spatial planes, so as to place the reinforcing fibers along three oblique directions with respect to the panel face.

14. A process as described in claim 12, to make in a continuous process a glass fiber structure including a tubular fabric envelope and the reinforcing web by means of four knitting machines, the hooks and storage needles of which move in four non-parallel spatial planes, so as to place the reinforcing fibers along three oblique directions with respect to the panel face.

15. A process, according to claim 14 to fold and to insert the longitudinal edges of said metallic membrane into parallel glass reinforced plastic channels woven or knitted into said panel envelope, so that each longitudinal edge of the membrane is free to slide along the plane surface defined by each said channel.

16. A process, according to claim 15, to form the sliding surfaces of said glass reinforced plastic channels holding the longitudinal edges of said membrane along two perpendicular planes, the intersection of which is a line parallel to the longitudinal edges of the membrane covered panel face.

* * * * *